Aug. 17, 1965   R. LE BRUSQUE   3,200,682
DEVICE FOR CONTROLLING THE MOTIONS OF THE TEMPLATE
HOLDER OF A COPYING LATHE
Filed May 23, 1961   2 Sheets-Sheet 1
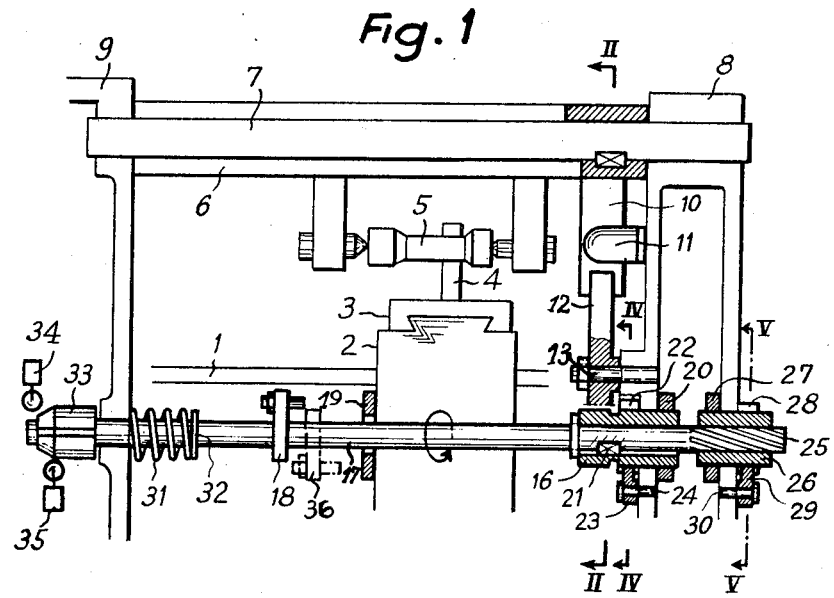
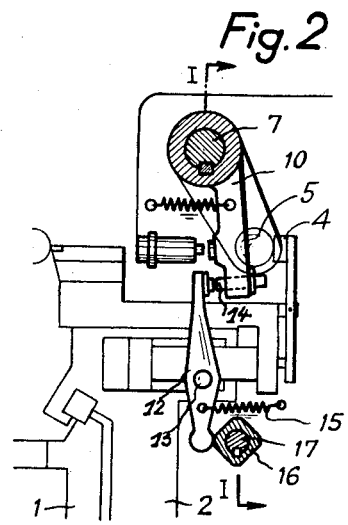
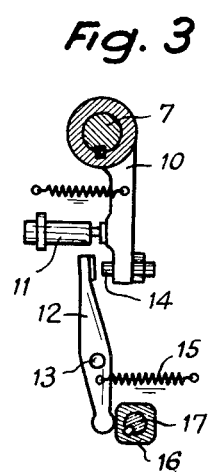
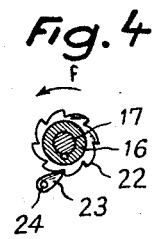
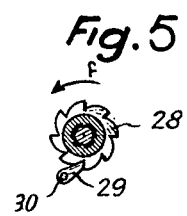

United States Patent Office 3,200,682
Patented Aug. 17, 1965

3,200,682
DEVICE FOR CONTROLLING THE MOTIONS OF THE TEMPLATE HOLDER OF A COPYING LATHE
René Le Brusque, Malakoff, Seine, France, assignor to H. Ernault Batignolles S.A., Paris, France, a company of France
Filed May 23, 1961, Ser. No. 112,059
Claims priority, application France, May 31, 1960, 829,660
7 Claims. (Cl. 82—14)

This invention relates to copying machine tools and more particularly to devices for controlling a template holder in a copying lathe.

In copying machine tools, such as lathes, having several machining stages, the distance between the template, or master, and the part to be machined is usually varied, the different positions of the template holder being controlled by devices subordinated to the rhythm of the operation cycle to be performed. One type of these known devices comprises a bar with adjustable stops cooperating with the lathe saddle in such a way that, at the end of each forward movement of the latter, an axial displacement of said bar modifies the position of the template holder, generally by hydraulic means.

Such control devices are usually of a complicated nature because of the information and selection means they include. They are only justified when a great number of roughing cuts are necessary before finishing.

In mass production, however, raw castings or forgings can be fed into the lathe. These can be easily machined by no more than two cuts, and in many cases even a single cut may be sufficient.

Thus, the object of the present invention is a simple mechanical device automatically controlling a stop which, in turn, determines the position of the template holder during one roughing cut preceding the finishing cut.

According to the present invention there is provided a copying lathe in which successive forward strokes of the saddle correspond to alternating roughing and finishing cut cycles, said lathe comprising a control device for controlling the alternative movements of the template holder between a roughing cut position in which the template is maintained by said holder at a first given distance from a workpiece mounted on the lathe, and a finishing cut position in which said template is maintained by said holder at a second given distance from said workpiece, characterized in that said control device comprises a fixed stop and a displaceable stop engageable each by said holder for determining said finishing cut and roughing cut positions of the same, respectively, the movements of said displaceable stop being controlled by a cam in response to said alternating roughing and finishing cut cycles, said cam bringing said displaceable stop prior to the start of each roughing cut cycle into an active position wherein said displaceable stop engages said holder to maintain the same in said roughing cut position, whereas said cam brings said displaceable stop prior to the start of each finishing cut cycle into an inactive position wherein said displaceable stop is disengaged from said holder so that the latter engages said fixed stop to be maintained thereby in said finishing cut position, said device further comprising means for maintaining said cam during each roughing cut cycle and during each finishing cut cycle in respective positions corresponding to said active position and to said inactive position of the displaceable stop, respectively, and for shifting said cam from one of said respective positions toward one at the end of each one of said cut cycles of the lathe.

Other objects and advantages of the invention will become apparent from the following description, which is taken in connection with the accompanying drawing which illustrates several embodiments of the invention, by way of example, and wherein:

FIG. 1 is a side view, partially in section taken along the line I—I of FIG. 2, of a template holder control device mounted on a copying lathe with a pendular template holder.

FIG. 2 is a cross-section along the line II—II of FIG. 1, showing the device in the position coresponding to the roughing cut.

FIG. 3 is a cross-section similar to the one of FIG. 2, showing the device in the position corresponding to the finishing cut.

FIGS. 4 and 5 are cross-sectional views taken along the lines IV—IV and V—V of FIG. 1, respectively, and showing the means for controlling the angular position of the cam.

Figure 6:
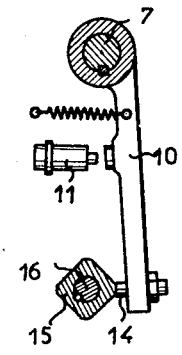
Figure 7:
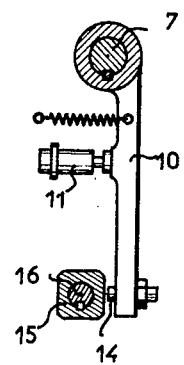
Figure 8:
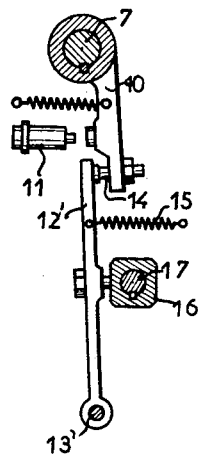
Figure 9:
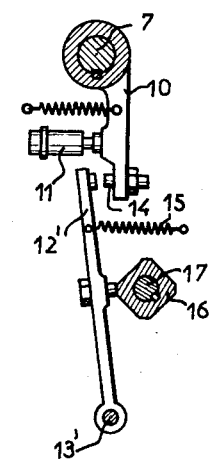

FIGS. 6 and 7 are views similar to FIGS. 2 and 3, showing another embodiment of the control device, and FIGS. 8 and 9 are views similar to FIGS. 6 and 7, showing a modified construction of the control device.

In FIGS. 1 and 2 the parts of the lathe, the copying apparatus and the template holder are drawn in light lines while the template holder control device proper is shown in heavier lines.

The lathe comprises a bench 1 on which a saddle 2 is displaceable by conventional means. The motions of a tool slide 3 mounted on the saddle and transversely movable thereon are controlled in the usual manner by a feeler 4. This feeler cooperates with a template 5 mounted between the two prongs of a template holder 6 suspended by means of a shaft 7 on supports 8 and 9 integral with the lathe frame.

The pattern holder is integral with an arm 10 which during the finishing cut rests on a micrometrically adjustable stop 11 mounted on support 8, which thus establishes the position of the template (FIG. 3) during said finishing cut.

One of the ends of a rocker beam 12 pivotally mounted on a fixed axle 13 acts as a second stop for arm 10. For this purpose the latter is provided with an adjustable stop screw 14 adapted to engage the upper end of beam 12 the lower end of which is permanently kept in engagement with a square shaped cam 16, by means of a spring 15.

Square shaped cam 16 is mounted on a bar 17 extending parallel to the axle of the lathe and provided with a stop 18 the longitudinal position of which on bar 17 is adjustable at will. This stop cooperates with a member 19 integral with saddle 2, so as to force the bar 17 into effecting at the end of each forward stroke of the saddle a linear movement in an axial direction, of a predetermined amplitude.

Cam 16 is centered in support 8, and axially maintained in place by a nut 20. Bar 17 and cam 16 are maintained in a fixed angular relationship by a key 21. Cam 16 is provided with ratchet wheel teeth 22 cooperating with a catch 23 pivoted on a fixed axis 24 (FIG. 4).

In the immediate vicinity of cam 16, bar 17 has a portion 25 thereof provided with a so-called "reversible pitch" thread engaging the internal thread of a nut 26 centered in support 8 where it is held axially in place by a nut 27. Nut 26 is also provided with ratchet wheel teeth cooperating with a catch 29 pivoted on a fixed axis 30 (FIG. 5).

The two ratchet gears allow cam 16 and nut 26 to be rotated only in the direction indicated by arrows in FIGS. 4 and 5.

A spring 31 inserted between the fixed support 9 and a shoulder 32 provided on bar 17 tends to displace the latter in a direction opposite to that of the axial movement of bar 17 under the action of saddle 2.

A second square shaped cam 33 is mounted at the other end of the bar 17 and cooperates with two microswitches 34 and 35 the respective functions of which will be described below.

The position of stop 18 on bar 17 is adjusted in such a manner that the magnitude of the axial displacement of the bar at the end of each forward stroke of the saddle is equal to ⅛ of the pitch of thread 25; to achieve this result ratchet wheels 28 and 22 have eight teeth each.

The control device operates as follows during a two stage machining operation comprising one roughing cut and one finishing cut:

At the outset the angular position of the bar 17 is such that the lower end of rocker beam 12 rests on one of the conveniently rounded corners of square shaped cam 16 (FIG. 2). Thus, the upper end of rocker beam 12 rests on stop 14 provided on arm 10, and the template holder 6 is maintained in an angular position in which template 5 controls the roughing cut.

At the end of the forward stroke of saddle 2, bar 17 is axially displaced until it reaches a position in which cam 33 acts in the usual manner on microswitch 34 to stop the saddle, than reverse its movement, and cause the tool slide 3 to be retracted. During this movement of bar 17, nut 26 engaging threaded portion 25 is caused to effect ⅛ of a complete revolution. Catch 29 thus engages the next tooth of ratchet wheel 28. At this stage, the cam 16 solid with the bar 17 is not rotated.

When saddle 2 slides back spring 31 brings bar 17 back to its initial position. Nut 26 maintained against rotation by catch 29 causes the bar 17 to effect ⅛ of a complete revolution and thus to rotate cam 16 which, at the end of this movement, is maintained in its new angular position by catch 23 engaged with the next tooth of ratchet wheel 22.

Thus, during the next forward stroke of the saddle the lower end of rocker beam 12 comes to rest on one of the flat sides of cam 16 (FIG. 3). The upper end of the rocker beam is then disengaged from stop 14 of template holder arm 10 the position of which is determined during the finishing cut by fixed stop 11.

At the end of the finishing cut the return stroke of saddle 2 causes the cam 16 to effect once more ⅛ of a complete revolution thereby bringing the template holder back into the desired position for the roughing out of the next work piece. It will be understood that one full revolution of bar 17 corresponds to the machining of four different consecutive work pieces.

The cutting depth of the roughing cut with respect to that of the finishing cut can be adjusted within limits determined by the profile of cam 16, by conveniently adjusting the protruding end of stop 14 with respect to arm 10.

Whenever a single pass is required for the machining of a work piece, cam 16 is rendered inactive by increasing the clearance between the adjustable stop 14 mounted on the arm 10, and rocker beam 12, whereby arm 10 permanently engages fixed stop 11.

Microswitch 35 actuated by cam 33 controls the operation of the lathe after the roughing cut, thus initiating the finishing cut phase. To achieve this result, microswitch 35 is adapted to assume an active position when engaged by one of the corners of cam 33 (end of a roughing cut), and to assume an inactive position when engaged by one of the flat sides of the cam (end of a finishing cut). Whenever only one machining operation is required this microswitch can be eliminated.

The control device as described above is suited for machining cycles comprising roughing and finishing cuts over a given length. However, machining operations comprising roughing and finishing cuts over different lengths may also be performed; e.g. the roughing cut may be effected only over a fraction of the total length of the work piece, while the finishing cut is effected over the total length of said work piece. For that purpose, an additional stop 36 (shown in dotted lines) can be mounted on bar 17. The two stops 18 and 36 assume alternatively an active position due to the successive angular movements of bar 17.

In the modified embodiment shown in FIGS. 6 and 7, the arm 10 has a greater length, and its adjustable stop 14 directly rests on cam 16.

In another embodiment shown on FIGS. 8 and 9, the axle 13' is located at one of the ends of the rocker beam 12'. This allows the movements of the other end engaging adjustable stop 14 to be amplified, and cam 16 of smaller cross-sectional dimensions to be used.

Instead of being square shaped, cam 16 may have any other convenient shape enabling the rocker beam 12 to assume two different positions; also, instead of controlling the oscillations of a pendular template holder, cam 16 can be used for controlling the position of any other type template holder. In the embodiment shown in FIGS. 8 and 9, the rocker beam 12' may be mounted in a reversed position in which axle 13' is located adjacent the adjustable stop 14, and the opposite end of beam 12' engages cam 16, while stop 14 engages the central portion of beam 12'. Such an arrangement allows for comparatively small displacements of stop 14 while using a cam 16 of comparatively large dimensions.

What is claimed is:

1. In a copying lathe comprising a saddle the successive forward strokes of which correspond to alternating roughing and finishing cut cycles, and a template holder adapted to hold a template and movable between a roughing cut position and a finishing cut position, a control device for controlling the movements of said holder between said positions, said control device comprising fixed stop means engageable during said finishing cut cycle by said holder for determining said finishing cut position thereof, stop means displaceable between an active position wherein it engages said holder for determining said roughing cut position thereof during said roughing cut cycle, and an inactive position wherein said displaceable stop means is disengaged from the holder during said finishing cut cycle; a rotatable cam of substantially square cam profile and having edges which determine said active position of said displaceable stop means, and flat sides which determine said inactive position of said displaceable stop means, a bar having a "reversible pitch" thread thereon, an axially fixed rotatable nut in engagement with the reversible pitch thread on the bar, said cam being rotationally solid with, and axially displaceable on said bar, said bar being solid with at least one axial stop engageable by said saddle when the latter reaches a given point of its forward stroke to cause an axial displacement of said bar; first ratchet-wheel-and-catch means adapted to lock said bar angularly during the forward motion of said saddle, and second ratchet-wheel-and-catch means adapted to lock said nut angularly and to cause thereby an angular displacement of said bar during the return motion of said saddle.

2. A control device is claimed in claim 1 comprising a second cam on said bar having a substantially square cam profile with four edges which successively act on switch means for controlling the lathe operation after each roughing cut cycle.

3. A control device as claimed in claim 1 wherein the displaceable stop means is constituted by a stop mounted on a lever adjacent one end thereof, the opposite ends of said lever being maintained in permanent engagement with said cam by elastic means, said lever being fulcrumed at a point thereof located between said two ends of said lever.

4. A control device as claimed in claim 1, wherein said displaceable stop means is constituted by a stop mounted on a lever adjacent one end thereof, the opposite end of said lever being pivotally mounted on a fixed axis, said lever being maintained by elastic means in permanent engagement with said cam, at a point located between said two ends of the lever.

5. A control device as claimed in claim 1, wherein said displaceable stop means is adjustable with respect to said fixed stop.

6. In a template controlled machine tool, a pendulous template supporting structure having a crank arm projecting therefrom, a carriage translatable longitudinally relative to said template, a fixed abutment positioned to engage said arm to establish a predetermined limit position therefor, and abutment means movable between two positions, a first of said positions being an operative position in which said movable abutment means directly contacts and maintains said arm in a predetermined position angularly spaced from said limit position, the other position being an inoperative position in which the movable abutment means allows the arm to engage the fixed abutment, a mechanism actuated by said carriage and engageable with the abutment means to move said abutment means from one of said two positions thereof to the other position after completion of a machining pass, and to move said abutment means from said other position to said one position thereof after completion of a subsequent machining pass, said mechanism comprising a rotatable rod axially reciprocable along a limited path between end positions, means for causing said rod to rotate in only one direction for less than one full turn during lengthwise motion of said rod towards one end position of said path, resilient means for urging said rod towards the other end position of said path, stop means on said rod engageable by said carriage upon completion of a machining pass to move said rod lengthwise against the action of said resilient means towards said one end position of said path, and a cam shaped member mounted on said rod for rotary motion therewith and having a surface contour of irregular shape to directly engage and move said abutment means between said two positions thereof as said rod rotates during said lengthwise movement thereof towards said one end position of its path.

7. In a template controlled machine tool having a pendulous template supporting structure, a carriage translatable longitudinally relative to said template, and abutment means for said structure movable between an operative position and an inoperative position: a rotatable rod mounted for lengthwise reciprocating motion within a path having opposite limits, a first axially stationary sleeve mounted on said rod for rotary motion therewith, a second axially fixed sleeve on said rod axially spaced from said first sleeve, means for locking said first sleeve and said second sleeve against rotation in one common direction, and means between said rod and said second sleeve for rotating said rod in a direction opposite to the first said direction as said rod is moved lengthwise towards one limit of said path, said first sleeve including a substantially square shaped cam portion directly engaging and moving said abutment means between the two positions thereof as said rod is rotated in said opposite direction.

References Cited by the Examiner
UNITED STATES PATENTS

| | | | |
|---|---|---|---|
| 1,312,999 | 8/19 | McKillecan | 74—127 |
| 1,412,928 | 4/22 | Armond | 74—127 |
| 2,780,488 | 2/57 | Kennedy | 74—567 |
| 2,969,692 | 1/61 | Pfarrwaller | 74—567 |
| 3,020,791 | 2/62 | Le Brusque | 82—14 |

WILLIAM W. DYER, JR., *Primary Examiner.*

LEON PEAR, *Examiner.*